Figure 1:
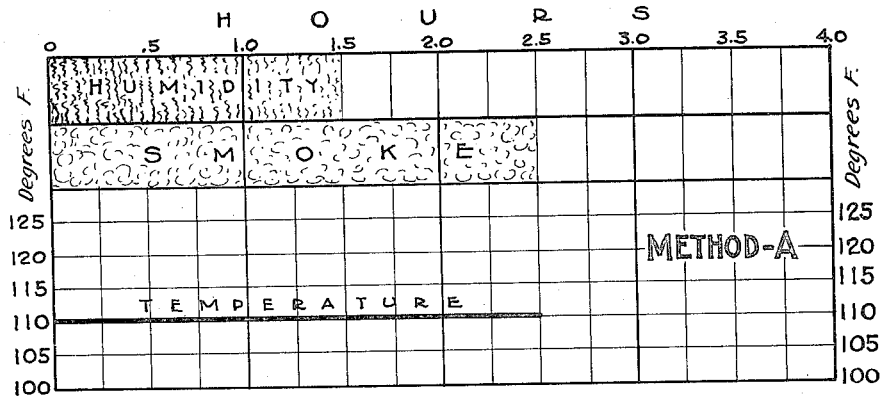

Dec. 18, 1934.  F. SEAVER  1,984,435
METHOD OF SMOKING FRANKFURTERS
Filed Aug. 31, 1931  2 Sheets-Sheet 1

Floyd Seaver
INVENTOR

BY _____
ATTORNEY

WITNESS

Floyd Seaver
INVENTOR

Patented Dec. 18, 1934

1,984,435

UNITED STATES PATENT OFFICE 1,984,435

METHOD OF SMOKING FRANKFURTERS

Floyd Seaver, Chicago, Ill., assignor to Swift and Company, Chicago, Ill., a corporation of Illinois Application August 31, 1931, Serial No. 560,389

9 Claims. (Cl. 99—9)

My invention relates to the production of smoked meats, especially those in sausage form. One of the objects of my invention is to produce a sausage having a smooth, tender casing relatively free of wrinkles. Another object of my invention is to produce a smoked sausage with a minimum of shrink.

Sausage of the so-called domestic variety, that is, those designed for a reasonably prompt consumption after production, such as Frankfurts, bologna, minced ham and the like, are conventionally subjected to the action of the smoke of smoldering wood. Smoking has been applied not only to sausages but to many other meat products, such as ham and bacon, chiefly to improve the flavor, color and preserve the product.

The smoking methods in ordinary commercial use, for convenience, may be classified in five groups, having certain differences but also having many points in common. In each case the common practice is to have a chamber in which heat, smoke, and air may be created, and according to the judgment of the operator, applied to the sausage which is usually located in the upper part of the chamber. Occasionally, mechanical means for circulating the heat, smoke, and air, or the sausage product, is utilized, but in all cases the chief consideration is preservation of the product, and to some extent, improvement of flavor and color, the degree of preservation and the type of flavor and color depending upon the will and skill of the operator, and to a marked degree is governed by the necessity for one or more of these results, that is, preservation, flavor, and color.

The general tendency is to shorten the process to a minimum period of time to avoid as much as possible excessive shrinkage or drying out which invariably occurs to a greater extent if the process is continued long enough to completely accomplish the fullest possibilities in preservation, flavor and color.

For convenience, I will designate the five common practices to which I have already referred, as A, B, C, D, and E.

Method A involves the use of light, low temperature smoke. By this method, Frankfurts are treated to a temperature of perhaps 100° F. to 110° F., though on some occasions the temperature may be permitted to go as high as 120° F., the product being subjected to a light smoke at around these temperatures for from one to two hours, or possibly three hours. The resulting finished product has generally a mild degree of preservation, due to smoke attack, a very mild smoked flavor, which in some cases cannot be detected, and a pale undeveloped color. The shrinkage is usually relatively low. The product is very susceptible to slime and mold, due to excessive moisture in the casing pores. Inasmuch as the meat will discolor and turn green on the inside very readily, the product is generally a very undesirable one even for quick consumption.

Method B involves the use of a light, high temperature smoke. In the practice of this method, Frankfurts are treated in smoke at a temperature of 140° F. to 160° F., although on some occasions the temperature may be permitted to go as high as 170° F. The product is held in light smoke at around these temperatures for from one to two hours. The resulting finished product generally has a mild degree of preservation, due to light smoke attack, a mild smoke flavor, which in some cases cannot be detected, and a bright clear color resulting primarily from the drying and/or parching of the casing. The shrinkage is usually relatively low. The resultant product has better keeping qualities than that produced by Method A so far as slime and mold are concerned, but in practice it is found to be little, if any, better than that produced by Method A so far as green discoloration of the meat is concerned.

Method C invloves the use of a medium smoke at moderate temperature. Frankfurts treated by this method are subjected to the action of a smoke of medium density at a temperature of perhaps 110° F. increasing gradually to 130° F. for a period of two to as much as three hours. The resulting finished product has a distinct advantage over that produced by Method A in that it has a more thoroughly dried casing, and a distinct advantage over that produced by Method B in that it has been subjected to a more thorough smoke attack, because the casing has not dried so rapidly, but the smoke attack is insufficient to give a product of very good keeping qualities. The drying of the casing and the rather short curing time at the temperatures used do not tend to produce a product of good keeping qualities.

Method D involves the use of a hard, moderate temperature smoke. Frankfurts treated by this method are treated at a temperature of about 110° F. which is gradually increased to 135° F. to 145° F. during a period of about four hours. The resulting finished product has relatively long keeping qualities and a deep color but is unsatisfactory because the casing has been dried, presenting a shelled or hardened condition, probably due to the hardening of the albumin adjoining the casing. Product treated by Method D will be relatively free from mold or slime after being held for a reasonable length of time. Because of the hardened shell casing it tends to wrinkle or shrivel giving an undesirable appearance. The processing shrink is relatively high in Method D.

Method E involves the use of a medium, high temperature smoke. The product is treated to a temperature of 140° F. to 160° F. or even higher for a period of approximately two hours, the smoke being applied only during the latter process during which time the temperature is practically dropped about 30° F. The resulting product has a fair degree of preservation chiefly due to the drying and parching of the casing. The product has a rather light clear color, a relatively low shrinkage, and the keeping qualities are found to be equal to or somewhat better than results from the use of Method B.

The foregoing methods cover fairly completely the common practices of smoking Frankfurts. Other classes of sausage, such as bologna, specialties, and the like are smoked in very much the same manner except that the temperatures are likely to average higher and/or the time period extended somewhat, principally because the product is thicker and heavier.

With all these processes, cool dry weather is preferred to warm or damp weather because in cool dry weather a more rapid circulation may be created, and the saw dust and wood will burn more freely and with less smudge. Smudge is undesirable because it gives the casing a smudged appearance. It is found that products smoked in cool dry weather usually present a casing more thoroughly dried and having a clear smoked color. During warm weather and particularly during wet weather desirable results are extremely difficult to obtain by any of the methods described above. It should be noted here that a dried casing is desirable because of its lesser susceptibility to the attack of slime and mold, and that a smudged color is to be avoided. The smudged color is avoided in ordinary practice by using less saw dust and wood on a humid day or by the more complete combustion which occurs when burning saw dust on a cool or cold day in comparatively dry weather because of the greater drafts required to cause these fuels to burn sufficiently to keep the chambers properly heated. Curtailment of the smudge is a decided disadvantage in that it materially reduces the preserving properties.

By my method I subject Frankfurts to a temperature of from 120° F. to 130° F. for a period of time sufficient to produce a condition which I will describe in detail, and then bring the temperature to 140° F. to 145° F. for a sufficient length of time to perform the entire operation in approximately four hours. During the period of lower temperature an extremely dense smudge is applied. This is sufficiently dense to cause it to be extremely stifling and suffocating, and during this period the condition of the air in the chamber is held without change, that is practically no fresh air is admitted and a condition as near as possible to 100 per cent saturation is maintained. During this period I am careful to avoid circulation of air on product and to avoid a dry atmosphere.

This quiescent humid condition of the atmosphere in the chamber is maintained for a period of time sufficient to permit the fats of lower melting point to render out, becoming emulsified with the gelatins, which at this time are also being freed, and to permit the excess of free fat to exude from the casing pores.

It will be noted that this action is taking place while all the casing tissues are moist by reason of the high humid condition of the atmosphere in the chamber. This action continues until the moisture in all the casing pores and tissues have been displaced under pressure of the heated fats which are expanding and exuding through the casing, the result being a casing fibre saturated with free fat instead of a casing fibre more or less saturated with water, such as results from low temperature and short time processing, or as against a parched or dried casing having free fat in the pores such as results from high temperature and short period smoking, or a casing fibre with gelatins in the pores as in the case of low or moderate temperature smoking carried on for long periods of time. During the entire period of low temperature processing, which usually approximates one and one-half to two hours, the smudge is continued. In this way, full benefit of the low temperature of smoke is obtained without the usual deep smudged color obtained by former practices where a heavy smudge is applied.

After the product is in proper condition, it is subjected to a somewhat higher temperature, that is, about 140° F. to 145° F. for the balance of the four hour period. During this period of time, the product is further heated and rendering and emulsifying continue in the interior. The chamber is dried out and the surface of the product relieved of any further moisture that may be forced out by expansion.

This latter portion of the process is accomplished in the absence of a smudge and with a fairly free circulation of fresh heated air. The operation may be satisfactorily carried on in the same chamber or in a separate chamber as may be convenient.

It will be noted that the total time employed in my process is approximately four hours, in the case of Frankfurts, in order that the cure may be completed and the danger of green discoloration in the center of the product minimized.

It has been noted that insufficient processing as by subjecting the product to a high temperature for short periods, or low temperatures for long periods of time, results in a product which tends to turn green under severe or often under moderate treatment. On the other hand, long processing at moderate or high temperature usually protects the product satisfactorily from green discoloration, but at the sacrifice of a soft, smooth, tender casing free from wrinkles.

In my process, a Frankfurt or other sausage product is produced with a relatively low shrink, having a smooth tender casing which is extremely pliable and does not wrinkle even when subjected to unreasonable extremes of commercial handling.

Sausages produced by my method are apparently entirely uniform in moisture content throughout the entire cross-section because of the absence of tough, dry albumin.

The usual deposit of solidified gelatins near the outer edge, so common in the case of sausage of the well smoked variety and which wrinkles easily, is absent in the sausage produced by my method, which results in a product which does not wrinkle because of the flexible casing and the lack of shelling or case-hardening on the outer rim.

Sausage produced by my method is resilient owing to the excellent emulsification of free fats and albumins, and is tender because of the emulsification process.

Of considerable importance is the fact that my method produces a sausage product in a much more desirable condition than is ordinarily possible to produce by any other method. The casing of my product is impervious to the effects of condensation, due to temperature changes encountered in manufacturing and commercial handling, as such moisture does not readily penetrate the casing, because of the relatively high percentage of free fat which coats the casing.

Because of the high antiseptic smoke treatment and the lack of moisture which has been replaced by free fat, slimes and molds do not propagate on the casing which has a uniform light color, and if treated with an artificial dye takes the color uniformly over the entire surface and throughout the entire lot.

The accompanying drawings consist of charts showing curves indicating the processes which have been hereinbefore described. For convenience, the process of the present invention is designated as Method X.

Figure 2:
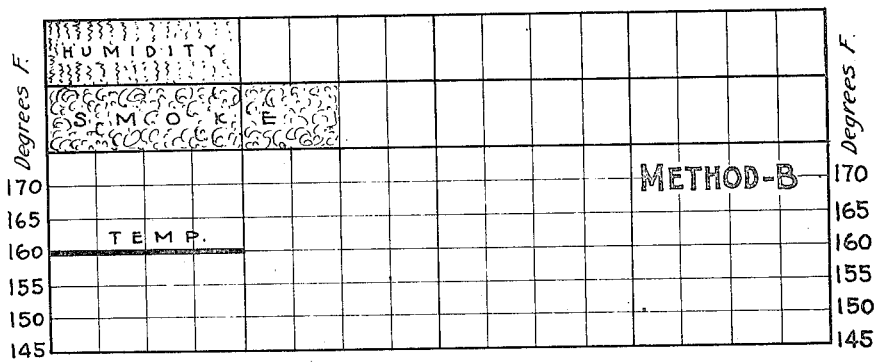
Figure 3:
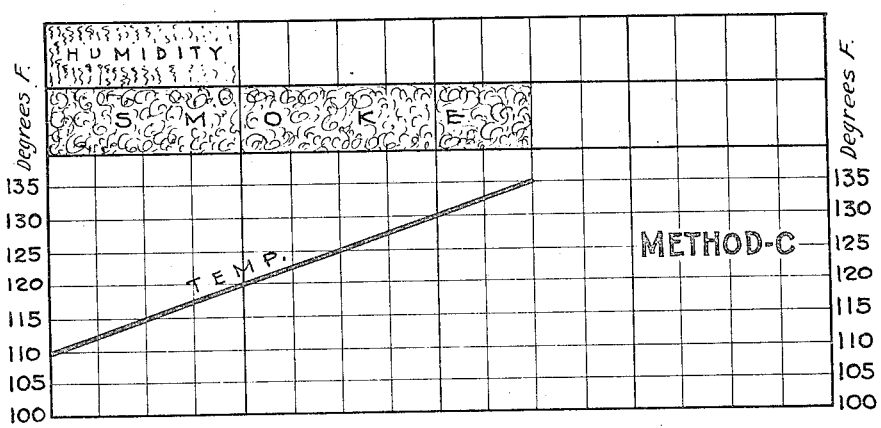
Figure 4:
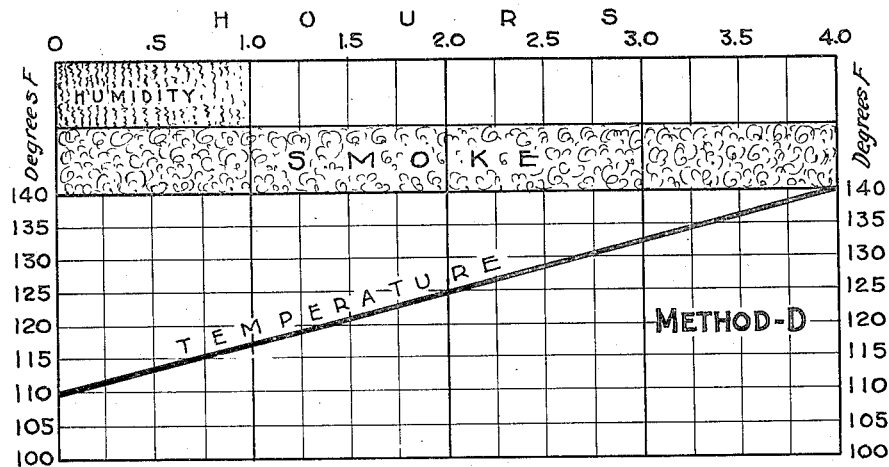
Figure 5:
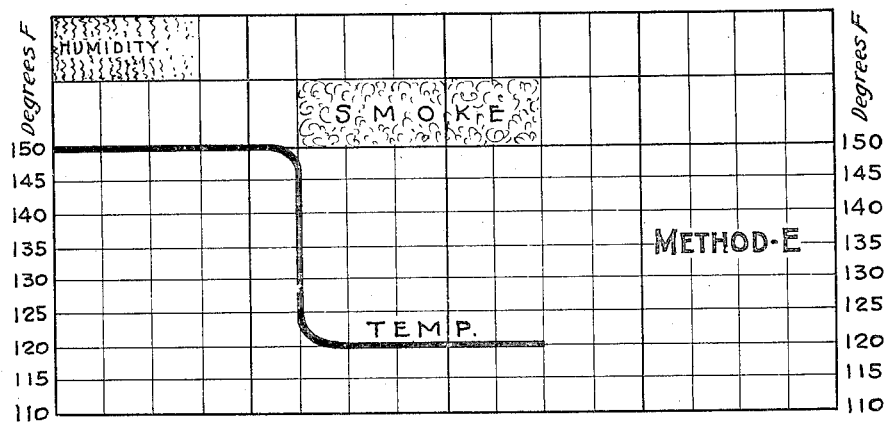
Figure 6:
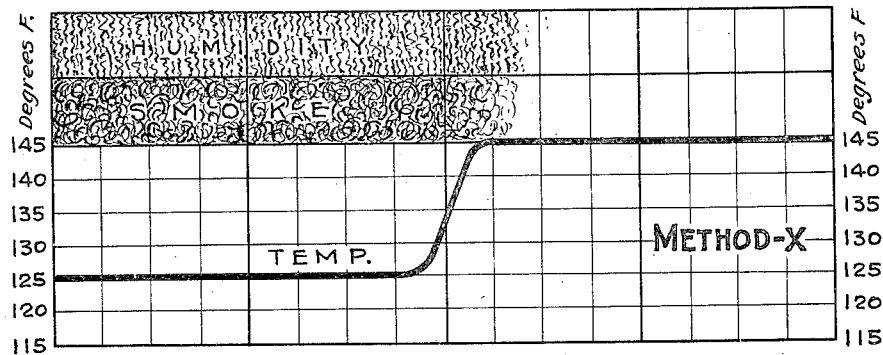

Figure 1 is a chart of Method A.
Figure 2 is a chart of Method B.
Figure 3 is a chart of Method C.
Figure 4 is a chart of Method D.
Figure 5 is a chart of Method E.
Figure 6 is a chart of Method X.

The temperature and time elements are shown by the curve in the lower portion of the chart, the abscissa of the curve denoting variation of time and the ordinate denoting variation in temperature. Superimposed on each of the charts are strips indicating density and time duration of humidity and smoke. By reference to the charts and by using each one quarter hour as a time unit equaling 1, and extending by the temperature for that period, the various schedules will sum up a total of relative points as follows:

```
A------------------------------------ 1100
B------------------------------------  960
C------------------------------------ 1100
D------------------------------------ 2000
E------------------------------------ 1350
X------------------------------------ 2160
```

It will be seen from this that from a curing standpoint the methods would rate as follows:

X—D—E—A and C—B

Heretofore Method D has been considered the safest cure, but it has the extreme disadvantage of producing a rather tough casing due to the drying and tanning effect, which forms a rather hard or set albumin crust underneath the casing, adding to the toughness and detracting from the palatability, as well as causing the product to wrinkle easily. Casing produced by Method D is not impervious and is affected by exudation of internal moisture and attack of moisture from condensation when removed to an atmosphere of higher temperature, as taken from a refrigerator to an outer room, as must often times be done in commercial handling.

It is clear that Method D has an advantage over Methods A, B, C and E, because of the additional preservation by reason of the action of the smoke. It is considerably less than preservation resulting from my process which I have designated as X. It will be noted that Method D does not coat the casing fibres or seal the casing pores with fat, nor is the albumin crust protected by fat, consequently, in the presence of moisture both the casing fibres and the albumin crust present a fertile field for slime and mold to grow, even though danger from this is less than in the case of product treated by Methods A, B, C, or E. It is understood that while temperature and time elements, which I have given in describing my method, are those which I have used satisfactorily, deviation therefrom may be made without departing from the spirit of my invention as designed in the claims which follow. It must also be understood that for convenience I have referred to the treatment of Frankfurts, but it is to be understood that other sausage products of various kinds, sizes, shapes, and textures and of various names, irrespective of the type of casing used may be treated with my process without departing from the spirit of my invention as defined in the claims which follow. Obviously, in treating other types of sausage than Frankfurts, the time and temperature will be varied but the resultant benefits of my process, will be substantially the same varying in so far as might be expected owing to the variance in size, shape, and texture.

It is understood that my invention does not involve any portion of sausage manufacturing or processing up to and including the stuffing operation, and my method may be practised with equal success regardless of whether fresh, light cured, or heavy cured meats are used in the manufacture of the products being processed.

I claim:

1. The method of treating sausage products which comprises, first, subjecting the product to the action of dense heated smoke in a humid quiescent chamber until the sausage casing is impregnated with freed fats and thereafter drying the product in a smoke free circulating atmosphere under conditions to further develop the rendering of free fats internally of the casing but without substantial liberation of the moisture content of the material within the interior of the casing.

2. In the treating of sausages, each of which is composed of an edible body containing meat tightly enclosed in a casing, the method comprising the subjecting of the sausages to smoking and preliminary heating in a quiescent, dense smoke atmosphere of high humidity until resulting rendered free fats impregnate the pores and tissues of the casings and displace the moisture thereof, and thereafter subjecting the smoked partially treated sausages to further heating in a drying atmosphere sufficiently long to further render free fats and to effect emulsification of the thus rendered free fats and albumin at or near the edge of the sausage, the final heating being carried out under conditions whereby the fat impregnated casing while being exteriorly dried will substantially retain for the sausages, the moisture contained therein.

3. In the manufacture of smoked sausage for sale and market distribution the method of smoking and finally curing unsmoked sausages each of which comprises a meat body tightly enclosed within an outside casing provided by an animal product usually employed for such purpose, which method comprises the subjecting of the unsmoked sausage to smoking and preliminary heating in a smoking room wherein the temperature is approximately of from 120° F. to 130° F., wherein the atmosphere is quiescent and in which the smoke atmosphere is relatively dense, and wherein the humidity is high, so high that little if any moisture evaporates from the sausage during the preliminary heating, continuing the application of the preliminary heat long enough to develop free grease some of which becomes emulsified with other substances as freed gelatins and albumins and some of which exudes through and from the casing pores, this preliminary heating being continued until all moisture in all the casing pores and tissues have been displaced by the free grease thereby resulting in a casing fiber saturated with free grease, and thereafter subjecting the thus preliminary treated sausage to a drying atmosphere which has a temperature of from 140° F. to 145° F. to dry the exterior of the Frankfurts, to further render out free greases and effect further emulsification as with albumins, which final heating is carried out with relatively little escape of moisture from the sausage body because of the casing being saturated with the free greases resulting from the preliminary heating process.

4. The method as per claim last preceding in which the preliminary heating in the atmosphere of high humidity is continued over a period approximately from one and one-half to two hours and in which the total heating period for both the preliminary heating and the final higher heating is approximately four hours.

5. In the treating of sausages, each of which is composed of an edible body containing meat tightly enclosed in a casing, the method comprising the subjecting of the sausages to smoking and preliminary heating in a quiescent, dense smoke atmosphere of high humidity at a temperature between approximately 120° F. and 130° F., until resulting rendered free fats impregnate the pores and tissues of the casings and displace the moisture thereof, and thereafter subjecting the smoked partially treated sausages to further heating at a temperature between approximately 140° F. and 145° F., in a drying atmosphere sufficiently long to further render free fats and to effect emulsification of the thus rendered free fats and albumin at or near the surface of the sausage, the final heating being carried out under conditions whereby the fat impregnated casing while being exteriorly dried will substantially retain for the sausages, the moisture contained therein.

6. In the treating of sausages, each of which is composed of an edible body containing meat tightly enclosed in a casing, the method comprising the subjecting of the sausages to smoking and preliminary heating in a quiescent, dense smoke atmosphere of high humidity at a temperature between approximately 120° F. and 130° F., until resulting rendered free fats impregnate the pores and tissues of the casings and displace the moisture thereof, and thereafter subjecting the smoked partially treated sausages to further heating at a temperature between approximately 140° F. and 145° F., in a drying atmosphere sufficiently long to further render free fats and to effect emulsification of the thus rendered free fats and albumin at or near the surface of the sausage, the final heating being carried out under conditions whereby the fat impregnated casing while being exteriorly dried will substantially retain for the sausages, the moisture contained therein, the subsequent treatment in the drying atmosphere being in effect a continuation of and immediately follows the preliminary heating incident to the smoke treatment, the combined heat treatments extending over a period of approximately four hours.

7. The method of treating sausages which comprises first subjecting the product to the action of heated smoke in a humid quiescent chamber a sufficient length of time to develop a casing impregnated with fats and subsequently subjecting to higher temperatures in a substantially smoke free circulating drying atmosphere a sufficient length of time to develop further free fats without substantial removal of the moisture content of the sausages.

8. The method of treating sausage which consists in subjecting the product to a temperature of approximately 120° F. to 130° F. in the presence of heavy wood smoke in a quiescent atmosphere of high humidity for from approximately one and one-half to two hours, and subsequently subjecting to temperatures of approximately 140° F. to 145° F. for from two to two and one-half hours in an atmosphere sufficiently dry to effect drying the exterior of the sausage.

9. The method of treating sausage products which consists in rendering out fats of lower melting point in the presence of dense smoke in a humid, quiescent atmosphere, emulsifying some of such fat with the gelatins present in the product, permitting the excess of free fat to exude from the casing pores while the casing tissues are moist and driving the moisture out of the casing pores, substituting for such moisture said fats, and thereafter subjecting the sausage products to heating in a drying atmosphere in a manner to further render out free fats without appreciably eliminating any of the moisture content from the filling material within the casing.

FLOYD SEAVER.